US006808269B2

(12) United States Patent
Cobb

(10) Patent No.: US 6,808,269 B2
(45) **Date of Patent: *Oct. 26, 2004**

(54) PROJECTION APPARATUS USING SPATIAL LIGHT MODULATOR

(75) Inventor: Joshua M. Cobb, Victor, NY (US)

(73) Assignee: Eastman Kodak Company, Rochester, NY (US)

(*) Notice: Subject to any disclaimer, the term of this patent is extended or adjusted under 35 U.S.C. 154(b) by 81 days.

This patent is subject to a terminal disclaimer.

(21) Appl. No.: 10/050,309

(22) Filed: Jan. 16, 2002

(65) Prior Publication Data

US 2003/0133079 A1 Jul. 17, 2003

(51) Int. Cl.[7] ........................ G03B 21/00; G03B 21/28; G02F 1/1335

(52) U.S. Cl. ........................... 353/31; 353/81; 353/122; 349/5

(58) Field of Search ............................... 353/28, 30–34, 353/100, 101, 122, 81, 94, 84; 349/5, 9

(56) References Cited

U.S. PATENT DOCUMENTS

| | | | | |
|---|---|---|---|---|
| 3,202,039 A | | 8/1965 | Lang et al. | 88/1 |
| 3,681,521 A | | 8/1972 | Doi et al. | 350/169 |
| 4,185,297 A | | 1/1980 | Yamauchi et al. | 358/55 |
| 4,441,791 A | | 4/1984 | Hornbeck | 350/360 |
| 4,836,649 A | | 6/1989 | Ledebuhr et al. | 350/331 |
| 5,098,183 A | | 3/1992 | Sonehara | 353/31 |
| 5,345,262 A | | 9/1994 | Yee et al. | 348/177 |
| 5,357,289 A | | 10/1994 | Konno et al. | 348/757 |
| 5,535,047 A | | 7/1996 | Hornbeck | 359/295 |
| 5,597,222 A | | 1/1997 | Doany et al. | 353/33 |
| 5,600,383 A | | 2/1997 | Hornbeck | 348/771 |
| 5,621,486 A | | 4/1997 | Doany et al. | 348/756 |
| 5,719,695 A | | 2/1998 | Heimbuch | 359/291 |
| 5,798,819 A | | 8/1998 | Hattori et al. | 353/33 |
| 5,808,795 A | | 9/1998 | Shimomura et al. | 359/448 |
| 5,907,437 A | | 5/1999 | Sprotbery et al. | 359/618 |
| 5,914,818 A | | 6/1999 | Tejada et al. | 359/663 |
| 5,918,961 A | | 7/1999 | Ueda | 353/20 |
| 5,930,050 A | | 7/1999 | Dewald | 359/670 |
| 6,008,951 A | | 12/1999 | Anderson | 359/677 |
| 6,010,121 A | | 1/2000 | Lee | 269/94 |
| 6,019,474 A | | 2/2000 | Doany et al. | 353/33 |
| 6,062,694 A | | 5/2000 | Oikawa et al. | 353/31 |
| 6,089,717 A | | 7/2000 | Iwai | 353/31 |
| 6,141,151 A | * | 10/2000 | Shimonura et al. | 359/618 |
| 6,172,813 B1 | | 1/2001 | Tadic-Galeb et al. | 359/618 |
| 6,247,816 B1 | * | 6/2001 | Cipolla et al. | 353/31 |
| 6,262,851 B1 | | 7/2001 | Marshall | 359/634 |
| 6,280,035 B1 | | 8/2001 | Tadic-Galeb et al. | 353/31 |
| 6,330,088 B1 | * | 12/2001 | Klug et al. | 359/23 |
| 6,517,211 B2 | * | 2/2003 | Mihara | 353/98 |
| 6,561,654 B2 | * | 5/2003 | Mukawa et al. | 353/31 |
| 6,672,721 B2 | * | 1/2004 | Aastuen et al. | 353/31 |
| 6,676,260 B2 | * | 1/2004 | Cobb et al. | 353/31 |

* cited by examiner

*Primary Examiner*—Alan A. Mathews
*Assistant Examiner*—Andrew Sever
(74) *Attorney, Agent, or Firm*—Nelson Adrian Blish

(57) ABSTRACT

A digital projection apparatus (10) for projection of a multicolor image includes a magnifying relay lens assembly (28) as part of the light modulation assembly (38) for each component color. The relay lens assembly (28) increases the effective f/# of incident light to the dichroic combiner (26) used to combine modulated light of each color from each light modulation assembly (38) in order to form the multicolor image. The magnifying relay lens assembly (28) also provides a reduced working distance for the projection lens (32), allowing a lower-cost design and facilitating substitution of the projection lens (32) best suited for a display surface (40).

69 Claims, 9 Drawing Sheets

30b
22b
24b
20b
38g
28b
38b
Ob
30g
24g
50,26
$I_{rgb}$
32
Og
O
28g
Or
28r
40
22g
20r
20g
38r
22r
24r
10
30r

PROJECTION APPARATUS USING SPATIAL LIGHT MODULATOR

CROSS REFERENCE TO RELATED APPLICATIONS

Reference is made to commonly-assigned copending U.S. patent application Ser. No. 09/813,207, filed Mar. 20, 2001, entitled A DIGITAL CINEMA PROJECTOR, by Kurtz et al., the disclosure of which is incorporated herein.

FIELD OF THE INVENTION

This invention generally relates to a projection apparatus for projecting a digital image that has been formed using a spatial light modulator and more particularly relates to an improved apparatus and method for relaying a multicolor digital image generated at multiple spatial light modulators to a dichroic combining element in the projection path of such a projection apparatus.

BACKGROUND OF THE INVENTION

In order to be considered as suitable replacements for conventional film projectors, digital projection systems must meet demanding requirements for image quality. This is particularly true for multicolor cinematic projection systems. In order to provide a competitive alternative to conventional cinematic-quality projectors, digital projection apparatus must meet high standards of performance, providing high resolution, wide color gamut, high brightness, and frame-sequential contrast ratios exceeding 1,000:1.

The most promising solutions for multicolor digital cinema projection employ, as image forming devices, one of two basic types of spatial light modulators. The first type of spatial light modulator is the digital micromirror device (DMD), developed by Texas Instruments, Inc., Dallas, Tex. DMD devices are described in a number of patents, for example U.S. Pat. Nos. 4,441,791; 5,535,047; 5,600,383 (all to Hornbeck); and U.S. Pat. No. 5,719,695 (Heimbuch). Optical designs for projection apparatus employing DMDs are disclosed in U.S. Pat. No. 5,914,818 (Tejada et al.); U.S. Pat. No. 5,930,050 (Dewald); U.S. Pat. No. 6,008,951 (Anderson); and U.S. Pat. No. 6,089,717 (Iwai). DMDs have been employed in digital projection systems. However, although DMD-based projectors demonstrate some capability to provide the necessary light throughput, contrast ratio, and color gamut, inherent resolution limitations (with current devices providing only 1024×768 pixels) and high component and system costs have restricted DMD acceptability for high-quality digital cinema projection.

The second type of spatial light modulator used for digital projection is the liquid crystal device (LCD). The LCD forms an image as an array of pixels by selectively modulating the polarization state of incident light for each corresponding pixel. LCDs appear to have advantages as spatial light modulators for high-quality digital cinema projection systems. These advantages include relatively large device size and favorable device yields. Among examples of electronic projection apparatus that utilize LCD spatial light modulators are those disclosed in U.S. Pat. No. 5,808,795 (Shimomura et al.); U.S. Pat. No. 5,798,819 (Hattori et al.); U.S. Pat. No. 5,918,961 (Ueda); U.S. Pat. No. 6,010,121 (Maki et al.); and U.S. Pat. No. 6,062,694 (Oikawa et al.).

In an electronic projection apparatus using spatial light modulators, individual colors, conventionally red, green, and blue (RGB), are separately modulated in a corresponding red, green, or blue portion of the optical path. The modulated light of each color is then combined in order to form a composite, multicolor RGB color image. There are two basic approaches for projection optics that combine the modulated color light. The first approach, which can be characterized as a convergent approach, is adapted from earlier, conventional projection systems. Using the convergent approach, the component red, green, and blue light have separate axes which are converged by projection optics that effectively bend each light path as necessary in order to form a composite, multicolor color image at some focal plane. As an illustrative example, U.S. Pat. No. 5,345,262 (Yee et al.) discloses a convergent video projection system. Significantly, the disclosure of U.S. Pat. No. 5,345,262 illustrates one of the major problems with the convergent projection approach, namely, that the separate color images must be properly registered on the projection surface. Misregistration or poor focus along any one of the color light projection paths can easily result in an unsatisfactory image. It is instructive to observe that, using this approach, the image paths are converged only at the focus plane.

U.S. Pat. No. 5,907,437 (Sprotbery et al.) discloses an attempt to simplify design complexity and alleviate some of the light path alignment and registration problems inherent to multicolor projection systems using the convergent approach described above. In the U.S. Pat. No. 5,907,437 disclosure, a light valve projection system is described in which a converging optical system converges the red, green, and blue modulated light paths in order to form a converged image, advantageously centered on the axis of a projection lens. The design strategy outlined in U.S. Pat. No. 5,907,437 thus simplifies the projection lens design task for a system using the convergent approach. However, other problems inherent to a convergent approach remain.

One notable problem with approaches similar to that disclosed in U.S. Pat. No. 5,907,437 is a relatively high etendue. As is well known in the optical arts, etendue relates to the amount of light that can be handled by an optical system. Potentially, the larger the etendue, the brighter the image. Numerically, etendue is proportional to the product of two factors, namely the image area and the numerical aperture. Increasing the numerical aperture, for example, increases etendue so that the optical system captures more light. Similarly, increasing the source image size, so that light originates over a larger area, increases etendue and, therefore, brightness. As a general rule, increased etendue results in a more complex and costly optical design. Using an approach such as that outlined in U.S. Pat. No. 5,907,437, for example, lens components in the optical system must be designed for large etendue. The source image area for the light that must be converged through system optics is the sum of the combined areas of the spatial light modulators in red, green, and blue light paths; notably, this is three times the area of the final multicolor image formed. That is, for the configuration disclosed in U.S. Pat. No. 5,907,437, optical components handle a sizable image area, therefore a high etendue, since red, green, and blue color paths are separate and must be optically converged. Moreover, although the configuration disclosed in U.S. Pat. No. 5,907,437 handles light from three times the area of the final multicolor image formed, this configuration does not afford any benefit of increased brightness, since each color path contains only one-third of the total light level. In particular, the second relay lens and the projection lens of a convergent optics system such as that disclosed in U.S. Pat. No. 5,907,437 are inherently constrained by a large etendue, which adds cost and complexity to such a solution. Moreover, the second relay lens must be color corrected over the full visible spectrum. At the same time, different segments of the relay lens and of the projection lens handle different wavelengths, so that localized lens imperfections, dust, or dirt not only affect the projected image, but can impact the color quality. In light, then, of etendue constraints, of color correction requirements, of dust and dirt sensitivity, and of the need for maximizing brightness levels for digital projection, there appear to be significant inherent limitations that hamper the convergent approach exemplified in U.S. Pat. No. 5,907,437.

An alternative approach to projection optics can be characterized as a coaxial approach. In contrast to the convergent approach in which component red, green, and blue light beams are bent to converge at a focal plane, the coaxial approach combines the component red, green, and blue modulated light beams along a common axis. In order to do this, the coaxial approach employs a dichroic combining element, such as an X-cube or Philips prism. X-cubes or X-prisms and related dichroic optical elements, such as those disclosed in U.S. Pat. No. 5,098,183 (Sonehara) and U.S. Pat. No. 6,019,474 (Doany et al.) are well known in the optical imaging arts. The dichroic combining element combines modulated light from each color path and folds the color paths together along a common axis in order to provide the combined color image to a projection lens. Referring to FIG. 1, there is shown a simplified block diagram of a conventional digital projection system 10 using the coaxial approach. Each color path (r=Red, g=Green, b=Blue) uses similar components for forming a modulated light beam. Individual components within each path are labeled with an appended r, g, or b, appropriately. For the description that follows, however, distinctions between color paths are specified only when necessary. Following any of the three color paths, a light source 20 provides unmodulated light, which is conditioned by uniformizing optics 22 to provide a uniform illumination. A polarizing beamsplitter 24 directs light having the appropriate polarization state to a spatial light modulator 30 which selectively modulates the polarization state of the incident light over an array of pixel sites. The action of spatial light modulator 30 forms an image. The modulated light from this image, transmitted along an optical axis $O_r$, $O_g$, $O_b$ through polarizing beamsplitter 24, is directed to a dichroic combiner 26, typically an X-cube or a Philips prism. Dichroic combiner 26 combines the red, green, and blue modulated images from separate optical axes $O_r$, $O_g$, $O_b$ to form a combined, multicolor image for a projection lens 32 along a common optical axis O for projection onto a display surface 40, such as a projection screen.

In contrast to the convergent approach outlined above with reference to U.S. Pat. No. 5,907,437, the coaxial approach, as shown in the block diagram of FIG. 1 and as exemplified in U.S. Pat. No. 5,808,795 (Shimomura et al.) has a number of advantages. With respect to light throughput, the coaxial approach, because it combines light paths along a common axis, does not increase the etendue of the optical system. Instead, with respect to projection lens 32, dichroic combiner 26, by folding the appropriate optical axes $O_r$ and $O_b$ to join with optical axis $O_g$ and form a common optical axis O, optically overlaps the areas of spatial light modulators 30*r*, 30*g*, 30*b*. Thus, the etendue has no increase whether one, two, three, or more spatial light modulators are combined in this way. And since each light color is separately modulated, then combined and provided to projection lens 32 along a common optical axis O, no optical system is required between dichroic combiner 26 and projection lens 32.

A Philips prism, such as that disclosed in U.S. Pat. No. 3,202,039 (DeLang et al.) could alternately be employed as dichroic combiner 26. Philips prisms have been employed as chromatic separator or combiner components in projector designs such as those disclosed in U.S. Pat. Nos. 6,280,035 and 6,172,813 (both to Tadic-Galeb et al.); U.S. Pat. No. 6,262,851 (Marshall); and U.S. Pat. No. 5,621,486 (Doany et al.), for example.

While digital projection systems 10 designed using the basic model of FIG. 1 are able to provide good levels of image quality, there is room for improvement. Constraints imposed by dichroic coatings are a key consideration. Dichroic coatings used for dichroic combiner 26 can be expensive and difficult to design and fabricate for suitable performance with incident light over a wide range of angles, particularly in projection applications where high brightness levels and a broad color gamut are needed. Dichroic coatings reflect and transmit light as a function of incident angle and wavelength. As the incident angle varies, the wavelength of light that is transmitted or reflected also changes. Where a dichroic coating is used with an optical system having a low f/#, a broad spectrum will be reflected or transmitted by the coating, due to the wide range of incident angles.

FIGS. 2*a* and 2*b* illustrate the change in the performance of a dichroic coating as the range of incident light angles increases. Referring to FIGS. 2*a* and 2*b*, there is represented a light cone from a point source P and incident to a dichroic surface 36, which is disposed at a diagonal in these Figures. FIGS. 2*a* and 2*b* represent light incident to a dichroic surface 36 at two different f/# values. In FIG. 2*a*, the light cone, having a smaller f/#, is incident to dichroic surface 36 at a larger range of angles. Incident angles are considered with respect to a normal N to dichroic surface 36. Because of the difference between angle A at one extreme of the incident light beam and angle B at the opposite extreme, dichroic surface 36 will cause a color shift to occur across the transmitted and reflected light cones.

By comparison, the light cone is incident at a larger f/# in FIG. 2*b*. Here, there is very little difference between angles A' and B' at extreme edges of the incident light cone. In such a case, dichroic surface 36 response will cause correspondingly less color shift across the transmitted and reflected light cones than with the smaller f/# shown in FIG. 2*a*.

As is clear from FIGS. 2*a* and 2*b*, dichroic surface 36 has some support structure, typically a prism 42. For minimizing aberrations, the flatness of surfaces 44*a* and 44*b* is of more importance with the smaller f/# of FIG. 2*a* where the light cone presents a wider angular range, than with the larger f/# of FIG. 2*b* where the light cone presents a smaller angular range. Thus, if a larger f/# light cone can be used, surface tolerance requirements of prism 42 in a dichroic combiner can be relaxed, thereby reducing cost and alignment complexity. However, conventionally, a light cone having a smaller f/# is used in projection systems, since system designs are directed to maximizing brightness.

Related to the benefits of higher f/# illustrated in FIGS. 2*a* and 2*b* are the benefits of telecentricity illustrated by comparing FIGS. 2*c* and 2*d*. Here, point sources P1, P2, and P3 represent points on a flat image plane, with rays incident on dichroic surface 36. In FIG. 2*c*, light cones from point sources P1, P2, and P3 are telecentric and corresponding angles C and D are identical. By comparison, in FIG. 2*d*, the light cones are not telecentric and corresponding angles C' and D' differ. This difference in incident angles can cause P1 to have a slightly different color than P3, thereby producing a color shift over the field.

From FIGS. 2a–2d, it can be seen that there are advantages in providing telecentric light at a small range of incidence angles (that is, at high f/#). However, in practice, it has been shown to be difficult to obtain these advantages for digital projection apparatus, due to the need to maintain high brightness levels at the same time.

As is well known in the imaging arts, in order to maximize color gamut, each composite color should have a narrow spectral range, to provide as pure a saturated color as possible. For example, it would be difficult to produce a deep red color using a red light channel that also includes some green light. Thus, where a low f/# is used with a color-combining prism or other optical element, the broad spectral response of the dichroic coating reduces the color gamut. At the same time, however, a low f/#, because it collects more light at a wider angular range, is desirable for obtaining high brightness levels. While there are conventional corrective techniques for improving color gamut, such as filtering, these techniques can reduce brightness. The limitations of coatings within dichroic combiner 26, then, constrain the capability of digital projection system 10 optics to optimize both brightness level and color gamut.

Further limitations of the familiar X-cube dichroic combiner 26 are inherent in the manufacture of the device itself. The X-cube is assembled from four prisms, with the internal surfaces of each prism having appropriate dichroic coatings. In fabrication, prisms are glued together, with inner surface planes aligned as closely as possible. However, even slight tolerance errors in X-cube fabrication can result in imaging problems when these devices are used with conventional digital projection solutions. Further problems are a result of the difficulties in providing uniform, flat surfaces on outer faces of the assembled X-cube.

FIG. 3a illustrates the response of an idealized X-cube 126 to light directed from a light source P. X-cube 126 comprises four prisms 128a, 128b, 128c, and 128d, having appropriate surface treatments and cemented together. Surfaces 130a and 130b are treated to reflect light from P having the proper wavelength. Surfaces 130a and 130b must be perfectly planar and perfectly aligned with respect to one another to provide aberration-free reflection in order to form an image at point P'. In contrast with FIG. 3a, FIG. 3b shows the response of X-cube 126' in which surfaces 130a and 130b are not perfectly aligned. The misalignment of surfaces 130a and 130b causes light from point source P to form two separate images at points P1' and P2'. Aberration effects would be most noticeable when the distance between image points P1' and P2' is on the order of one pixel width or larger. Clearly, blur in an image that is reflected through X-cube 126' would be increasingly more pronounced with increasing distance, in any direction, between image points P1' and P2'. Correspondingly, the smaller the pixel dimensions, the greater the impact of an aberration due to imperfections in fabrication of X-cube 126'.

It can be readily appreciated that, in practice, fabrication of a perfect X-cube 126 as in FIG. 3a would be very difficult and some tolerance for error must be allowed. For this reason, it is advantageous, when designing an optical system using an X-cube 126, to minimize dependence on maintaining precise X-cube 126 tolerances.

Of related importance for imaging quality is preserving telecentricity wherever possible in the optical system. When cones of light from two different point source locations on the surface of spatial light modulator 30 are not telecentric, these different locations then present different incident angles to dichroic surfaces in dichroic combiner 26. In response, dichroic combiner 26 reflects different wavelength bands at different field positions, resulting in color shifts across the image. It is well known in the optical design arts that telecentric imaging at spatial light modulator 30 helps to further reduce contrast shading across the image.

As is another well known principle in design of projection apparatus, it is beneficial to minimize the retrofocus distance of projection lens 32, thus minimizing the working distance requirements and cost of projection lens 32. It would be preferable to avoid the cost and complexity requirements of a projection lens having a long back focal length relative to its effective focal length, such as the solution disclosed in U.S. Pat. No. 6,008,951 (Anderson), for example.

U.S. Pat. No. 5,597,222 (Doany et al.) discloses, for use in a digital projector, an optical relay lens system that alleviates some of the difficulties noted above that relate to inherent tolerance problems and projection lens working requirements. U.S. Pat. No. 5,597,222 discloses the use of a single 1×, double-telecentric relay lens to relay the combined image from individual RGB color paths to a MacNeille polarizing beamsplitter. In the Doany et al. patent, spatial light modulators are disposed very near a dichroic combiner X-cube, to minimize thereby some of the potential adverse effects of imperfections in outer surface flatness and tolerance errors in inner surface fabrication. However, this solution falls far short of what is needed to compensate for inherent problems with X-cube coatings and surfaces so that both image brightness and color gamut can be maintained. For example, the design noted in the Doany et al. disclosure fails to address inherent angular dependencies in the dichroic coating response, so that it remains difficult to support a large color gamut while maintaining image brightness at the same time. Moreover, the projection lens must also use a high numerical aperture with this design, which implies added cost over designs with lower numerical aperture. Because of the scale of spatial light modulator components, the design of U.S. Pat. No. 5,597,222 is still very dependent on high-quality X-cube design. Further, the arrangement disclosed in U.S. Pat. No. 5,597,222 employs a relatively large number of optical components between a polarizing beamsplitter and its modulating LCD. With a large number of optical components in the path of a polarized illumination source, some unavoidable stress birefringence would necessarily alter the polarization states of both unmodulated and modulated light traveling in both directions, resulting in loss of image contrast.

U.S. Pat. No. 6,247,816 (Cipolla et al.) discloses use of a 1× relay lens for relaying an intermediate image towards a dichroic combiner in only one of the color paths. The solution in U.S. Pat. No. 6,247,816 addresses a component packaging problem, but does not alleviate any of the angular constraints imposed by dichroic combiner response. Neither does the solution in U.S. Pat. No. 6,247,816 provide any relief with respect to back focal distance requirements of the projection lens.

Thus, it can be seen that there is a need for improvement in digital projection optics design that alleviates the inherent angular limitations of dichroic coatings while providing maximum brightness and color gamut, minimizes the working distance requirements of projection optics, and allows a high f/# for projection optics.

SUMMARY OF THE INVENTION

It is an object of the present invention to provide a projection apparatus for projecting a multicolor image.

Briefly, according to one aspect of the present invention, a projection apparatus comprises a first light modulation assembly. The first modulation assembly comprises a first spatial light modulator for modulating light having a first wavelength and forms a light source to form a first image. A first magnifying relay lens focuses and relays the first image A second spatial light modulator modulates light having a second wavelength and forms a second image. A second magnifying relay lens focuses and relays the second image. A third spatial light modulator for modulates light having a third wavelength which forms a third image, a third magnifying relay lens focuses and relays the third image. A dichroic combiner forms a multicolor image by combining the first, second, and third images. A projection lens projects the multicolor image.

It is a feature of the present invention that it provides a magnifying relay lens that is double-telecentric, to magnify the image formed by the spatial light modulator and to relay that image to a dichroic combiner. By magnifying the image, the magnifying relay lens effectively allows the dichroic combiner to operate at a higher f/#, accommodating a narrower range of incident angles, thus increasing color gamut across the projected image.

It is an advantage of the present invention that, because it relays modulated light to the dichroic combiner at a lower f/#, it allows use of a less expensive coating on the dichroic combiner.

It is a further advantage of the present invention that it provides a magnified image to the dichroic combiner, thereby reducing the dependence of the imaging system on precision fabrication of X-cube optics.

It is an advantage of the present invention that it allows the use of a projection lens having a reduced numerical aperture and a short working distance. By thus relaxing requirements of the projection lens, the present invention provides cost savings over more demanding designs. In addition, the present invention allows a projector to be designed with interchangeable projection lenses, so that an appropriate projection lens can be easily and economically substituted for a particular display environment. Further, by reducing numerical aperture requirements of the projection lens, the present invention inherently reduces the complexity inherent in the design of anamorphic projection lens elements.

It is a further advantage of the present invention that it provides a solution that does not introduce birefringence to projected light before the light is filtered by a polarizer, thereby preserving contrast ratio.

It is yet a further advantage of the present invention that it enjoys the benefits of brightness and color quality inherent to coaxial optical design and avoids the complex focus problems and lens design concerns of conventional convergent projection apparatus.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figure 1:
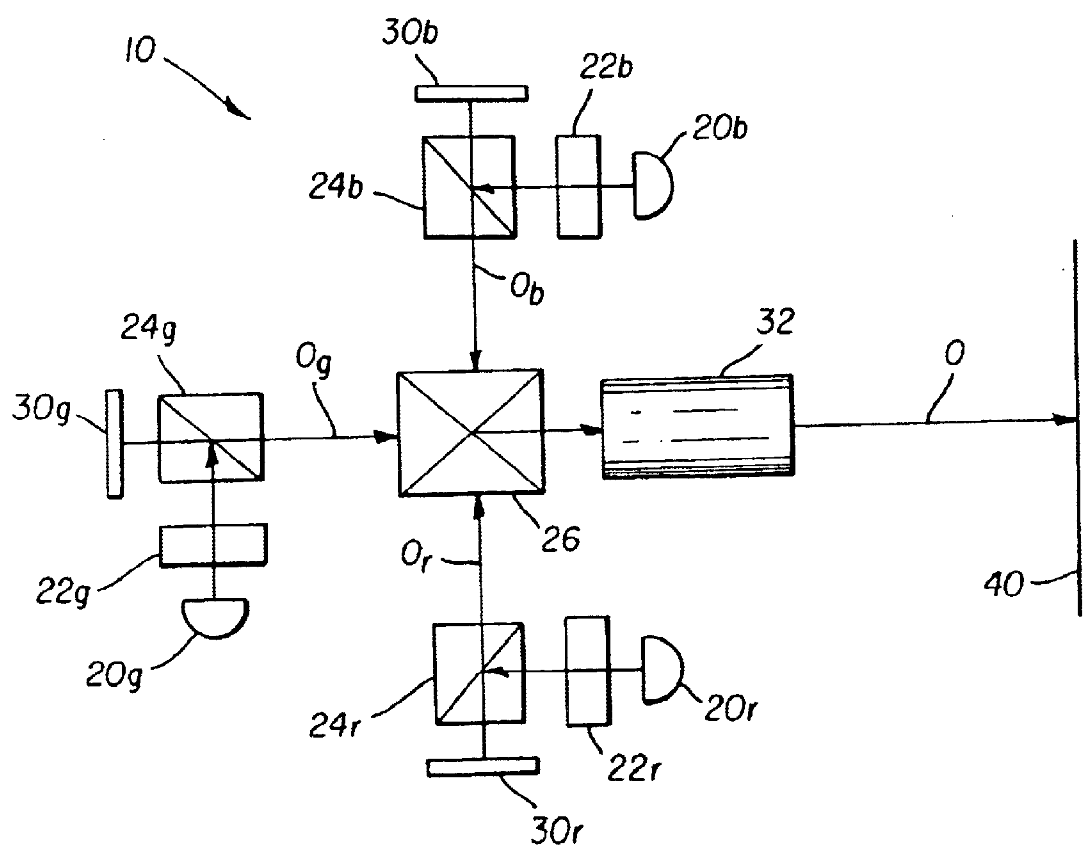
FIG. 1 is a schematic block diagram showing major components of a conventional, prior art digital projection apparatus.
Figure 2A:
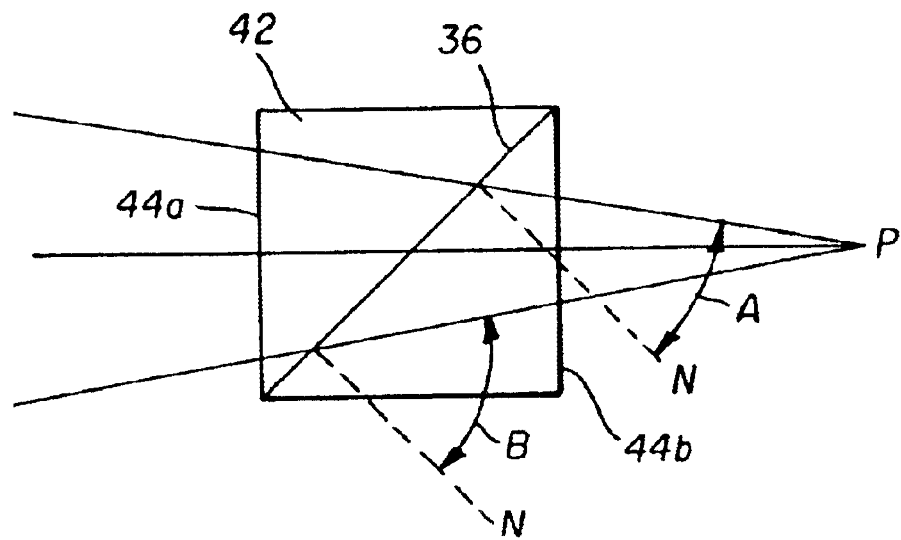
FIGS. 2*a* and 2*b* are ray diagrams showing incidence of light upon a dichroic coating at two different f/# values.
Figure 2B:
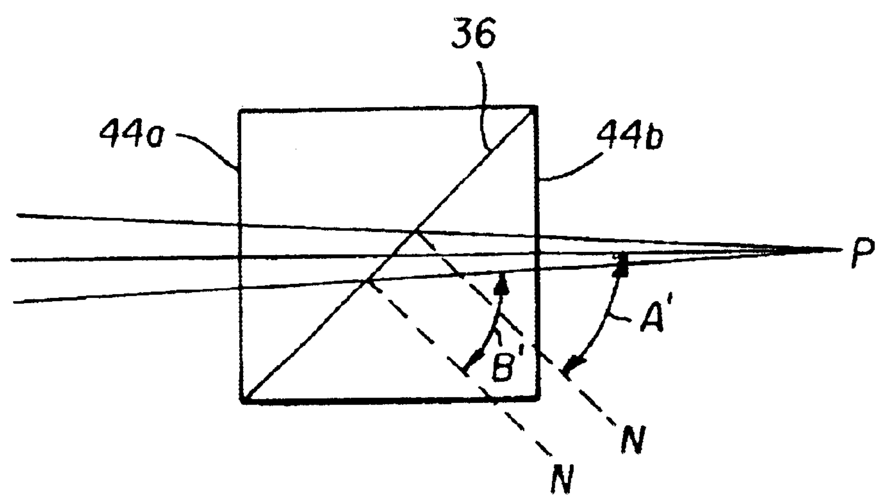
Figure 2C:
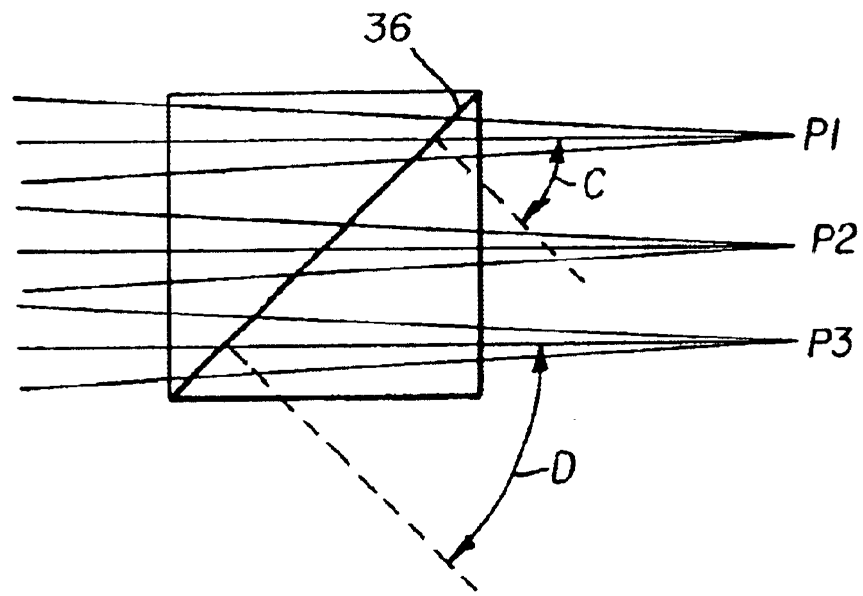
FIGS. 2*c* and 2*d* are ray diagrams showing non-telecentric and telecentric light incident upon a dichroic coating.
Figure 2D:
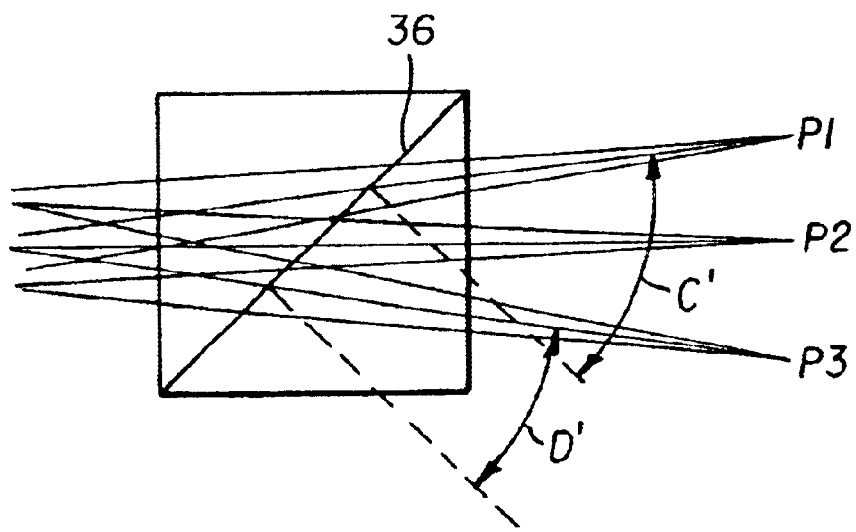
Figure 3A:
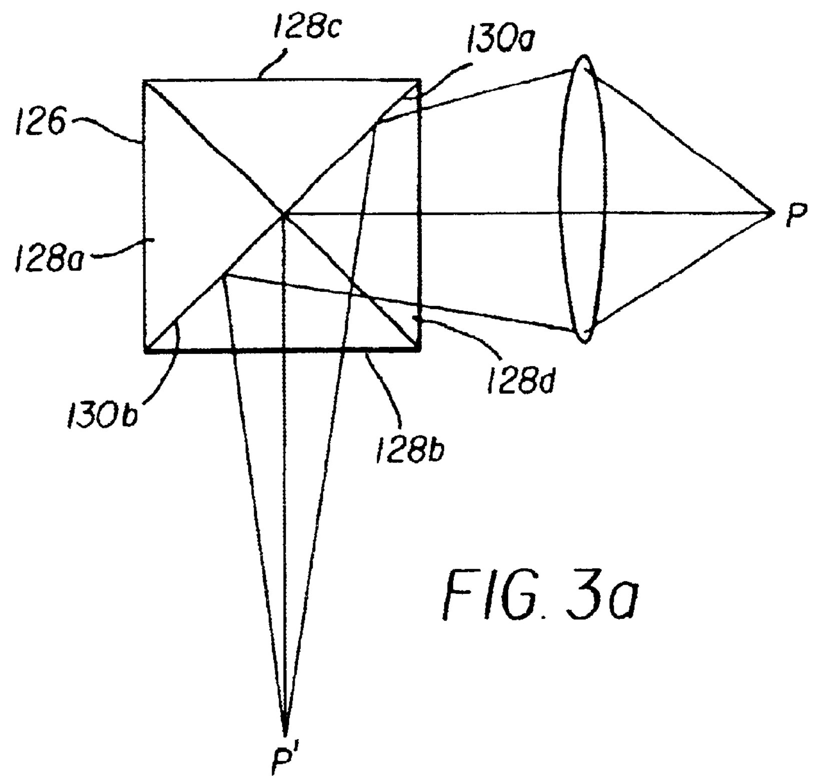
FIG. 3*a* shows the imaging response of an idealized X-cube.
Figure 3B:
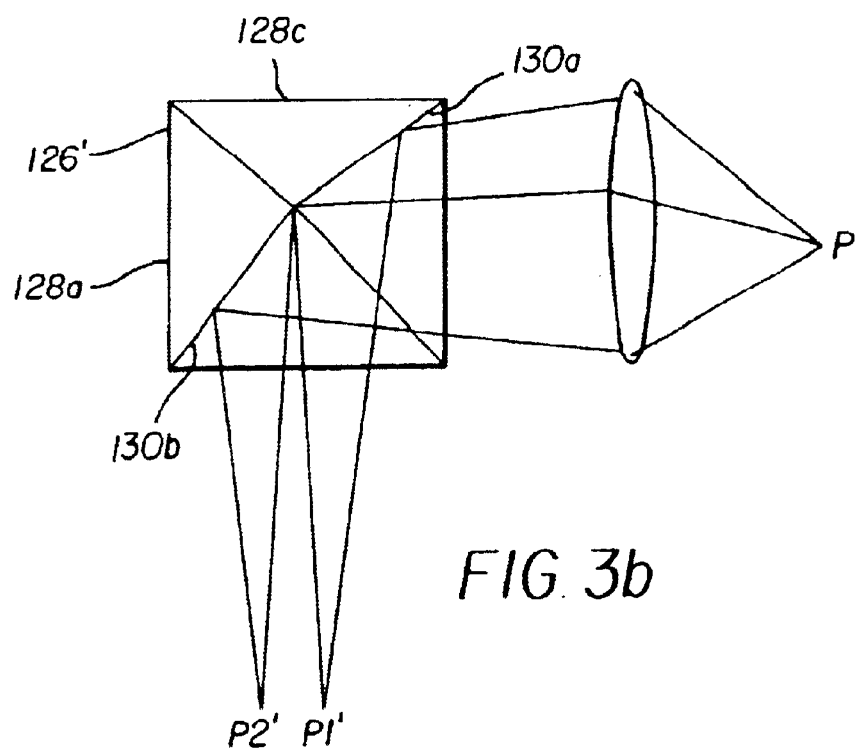
FIG. 3*b* shows the imaging response of an X-cube having slight misalignment errors.

In light of the description given in the background section above with reference to FIGS. 1 and 2*a*–2*d*, a goal of the present invention is to provide light to dichroic combiner 26 in telecentric form at a high f/#, taking advantage of the resulting relaxed requirements on dichroic combiner 26 fabrication while still providing the necessary brightness. The additional description relative to FIGS. 3*a* and 3*b* show that it would be advantageous to provide light to an X-cube or similar dichroic combiner where demands on mechanically precise fabrication of the X-cube or dichroic combiner are minimized.

Figure 4:
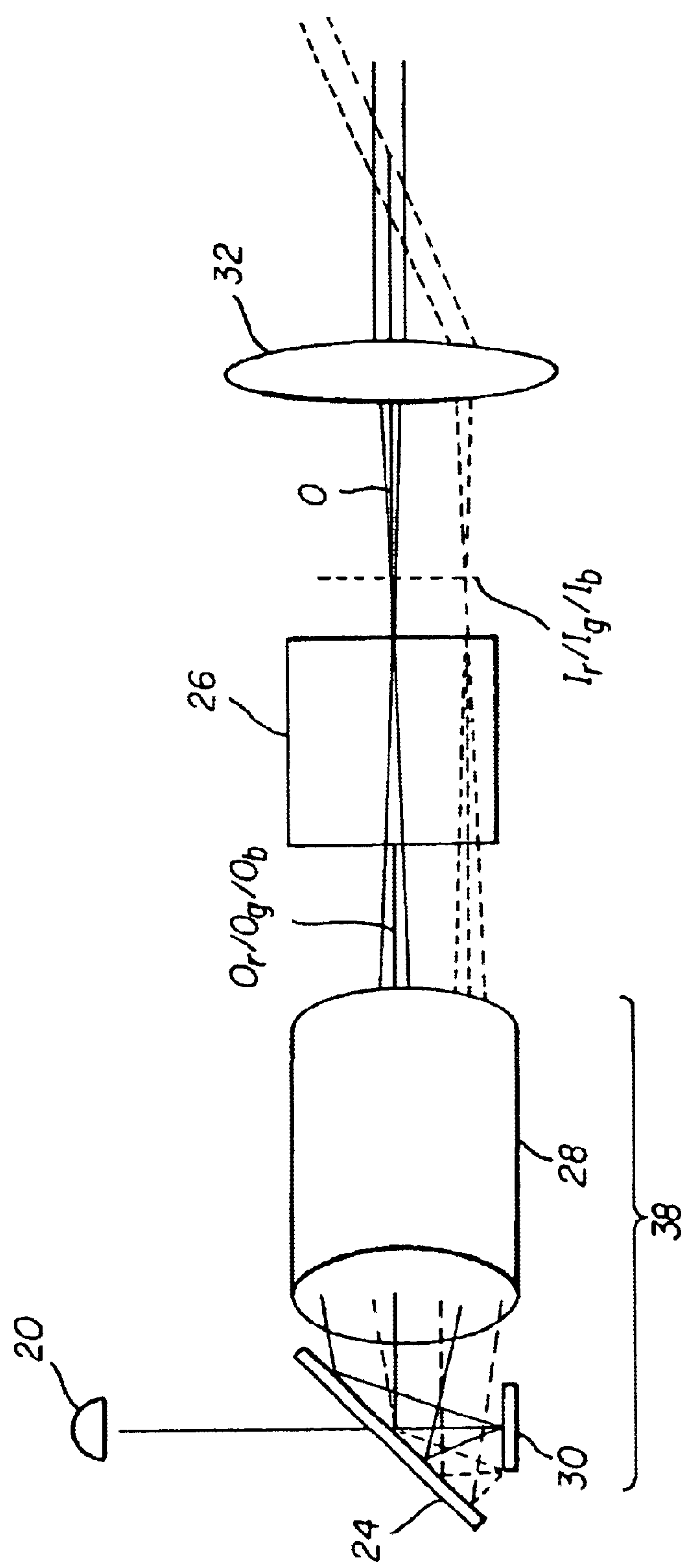
FIG. 4 is a block diagram showing the light modulation assembly of the present invention.

Referring to FIG. 4, there is shown, in schematic form, an implementation of components used in the optical path of each color of digital projection system 10 in the present invention. In each color channel, a light modulation assembly 38 comprises a magnifying relay lens 28 and spatial light modulator 30 that cooperate in order to form a magnified real image $I_r$, $I_g$, or $I_b$, as appropriate for the color channel. In order to form magnified real image $I_r$, $I_g$, or $I_b$, magnifying relay lens 28 magnifies, as its optical object, the image that is located on spatial light modulator 30 and reflected from polarizing beamsplitter 24. Magnifying relay lens 28 is double-telecentric, so that the modulated light beam directed along optical axis $O_r$, $O_g$, or $O_b$ to dichroic combiner 26 is in telecentric form. Because dichroic combiner 26 handles telecentric light, there is minimal tendency for color shading across magnified real image $I_r$, $I_g$, or $I_b$, due to angular variances. Significantly, by magnifying the image formed on spatial light modulator 30 with some magnification factor greater than 1×, magnifying relay lens 28 also effectively focuses magnified real image $I_r$, $I_g$, or $I_b$ toward dichroic combiner 26 at a higher f/# than 1× relay operation would provide. As a result, dichroic combiner 26 handles a narrower spectral band and is thereby able to provide a larger color gamut than would be achievable under a lower f/#. Moreover, with the use of magnifying relay lens 28, no light is lost even though a higher f/# is achieved at dichroic combiner 26, since a low f/# is still used at spatial light modulator 30. As a result, an improved magnified real image $I_r$, $I_g$, or $I_b$ is provided, as the output of dichroic combiner 26, along common optical axis O.

The arrangement of FIG. 4 also provides advantages for lowering cost and complexity requirements of projection lens 32. With the arrangement of FIG. 4, projection lens 32 can advantageously work at a higher f/# in order to project the multicolor image combined from each magnified real image $I_r$, $I_g$, or $I_b$ onto display surface 40 (not shown in FIG. 4). In addition, projection lens 32 needs only a small working distance to project the multicolor image combined from each magnified real image $I_r$, $I_g$, or $I_b$ onto display surface 40.

Unlike prior art implementations disclosed in U.S. Pat. Nos. 5,597,222 and 6,247,816 cited above, in which a 1× relay lens is used in the optics path, the apparatus and method of the present invention employ greater than unity magnification by magnifying relay lens 28. With a 2× magnification, for example, magnifying relay lens 28 provides magnified real image $I_r$, $I_g$, or $I_b$ as a 2× image to dichroic combiner 26. This effectively doubles the f/# requirement of dichroic combiner 26, for example, from a typical value of f/2.5 to f/5. An f/2.5 value can easily be outside the recommended range for coating performance of dichroic combiner 26. However, f/5 is typically well within the recommended range. Using incident modulated light at f/5, dichroic combiner 26 can form the modulated, multicolor image for projection, providing a large color gamut without color shade degradation. In addition, magnification creates an image with larger pixels, thereby reducing the effect of aberrations due to imperfect manufacture of dichroic combiner 26, as was described above with reference to FIGS. 3*a* and 3*b*.

Figure 5:
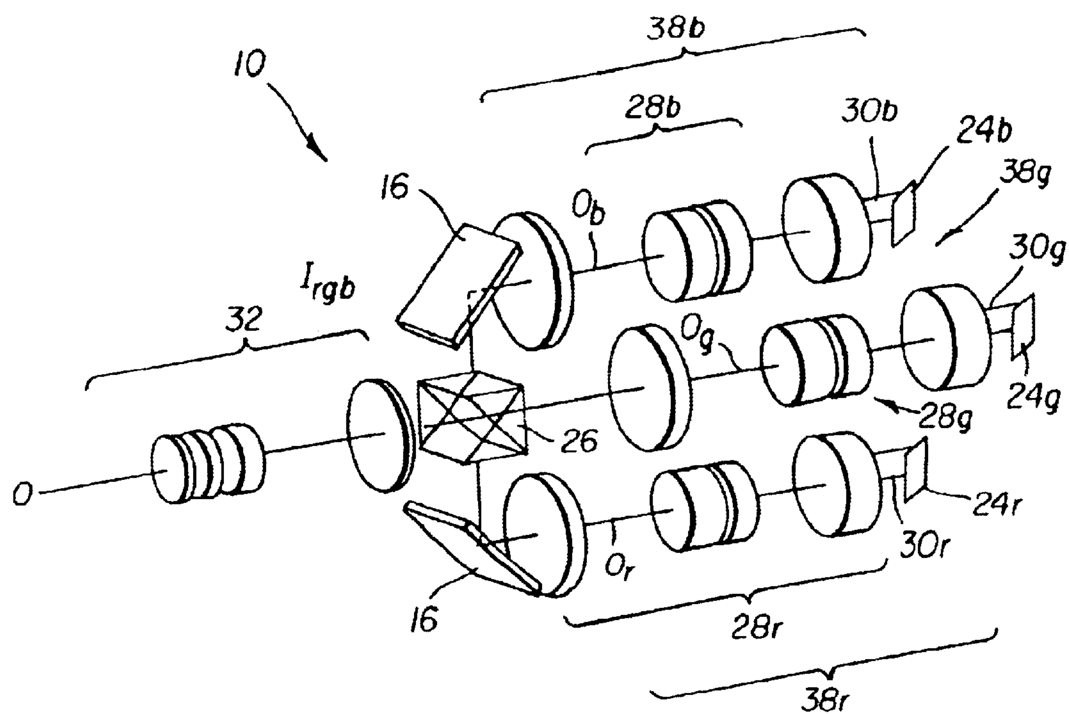
FIG. 5 is a perspective view from the front of a projection apparatus of the present invention, showing light modulation paths in a preferred embodiment.
Figure 6:
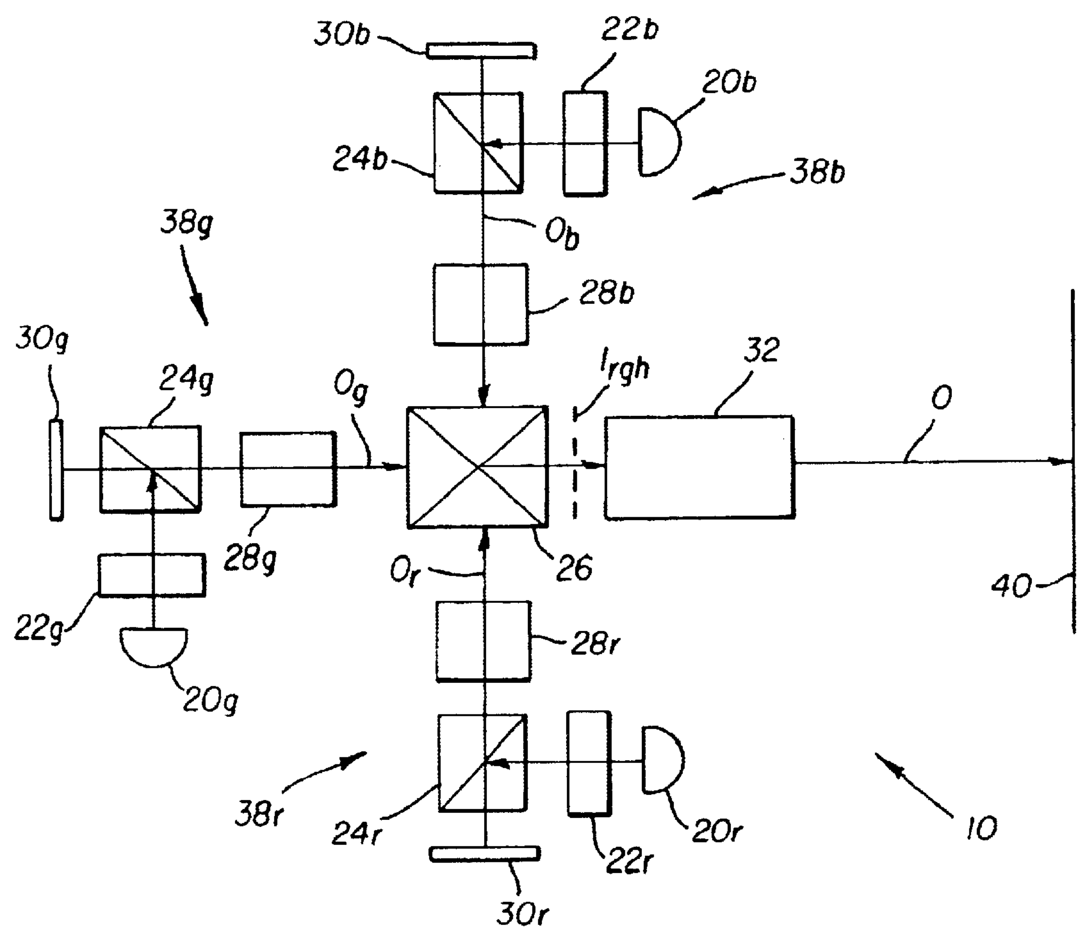
FIG. 6 is a schematic block diagram showing major components of a projection apparatus of the present invention.

Referring to FIG. 5, there is shown, in a sidewise perspective view, an arrangement of light modulation assemblies 38*r*, 38*g*, 38*b* and components in a preferred embodiment. FIG. 6 shows a simplified schematic block diagram of the preferred embodiment, without folding mirrors 16. Within each light modulation assembly 38*r*, 38*g*, 38*b*, the initial modulated light cone output from spatial light modulator 38*r*, 38*g*, 38*b* is relayed along optical axis $O_r/O_g/O_b$ by magnifying relay lens $\mathbf{28}_r$, $\mathbf{28}_g$, $\mathbf{28}_b$ to provide its magnified real image $I_r$, $I_g$, or $I_b$ near dichroic combiner 26. In the particular arrangement shown in FIG. 5, blue and red optical axes $O_b$ and $O_r$ of light modulation assemblies 38*b* and 38*r* are folded at mirrors 16. Dichroic combiner 26 combines the three different magnified real images $I_r$, $I_g$, and $I_b$ by selective reflection of the red and blue light and by transmission of the green light to form combined multicolor magnified image $I_{rgb}$ along common optical axis O at its output. Projection lens 32 then projects combined multicolor magnified image $I_{rgb}$ onto display surface 40 (shown in FIG. 6; not shown in FIG. 5).

It is instructive to note that, from the perspective of projection lens 32, combined multicolor magnified image $I_{rgb}$ may be a real image or a virtual image, depending on where the individual magnified real images $I_r$, $I_g$, and $I_b$ are formed relative to the spatial position of dichroic combiner 26. Combined multicolor magnified image $I_{rgb}$ forms a real image whenever the individual magnified real images $I_r$, $I_g$, and $I_b$ are formed between the front surface of dichroic combiner 26 and the rear of projection lens 32. This arrangement is indicated by the position of combined multicolor magnified image $I_{rgb}$ in FIG. 6. In contrast, if the individual magnified real images $I_r$, $I_g$, and $I_b$ are formed between the front surface of relay lens 28 and the front surface of dichroic combiner 26, combined multicolor magnified image $I_{rgb}$ is a virtual image with respect to projection lens 32. That is, there is no actual spatial "location" of combined multicolor magnified image $I_{rgb}$ in such a case. Instead, dichroic combiner 26 operates to combine the individual magnified real images $I_r$, $I_g$, and $I_b$ as a virtual combined multicolor magnified image $I_{rgb}$.

Whether combined multicolor magnified image $I_{rgb}$ is a real image or a virtual image, projection lens 32 is then designed with the necessary back focal length for projecting combined multicolor magnified image $I_{rgb}$ to display surface 40, from wherever combined multicolor magnified image $I_{rgb}$ is formed. Projection lens 32 may alternately incorporate an anamorphic attachment for adjusting the aspect ratio of the projected image, as is well known in the image projection arts.

The high f/# requirements, smaller relative size, reduced number of components, and relaxed tolerances made possible by the present invention reduce the cost and complexity of projection lens 32 design for digital projection. Projection lens 32 can therefore be designed to be easily interchangeable, such as for different screen sizes for example.

In a preferred embodiment, polarizing beamsplitter 24 is a wire-grid beamsplitter with a reflective LCD as spatial light modulator 30. A conventional MacNeille polarizing beamsplitter or equivalent component could be substituted for polarizing beamsplitter 24.

Figure 8:
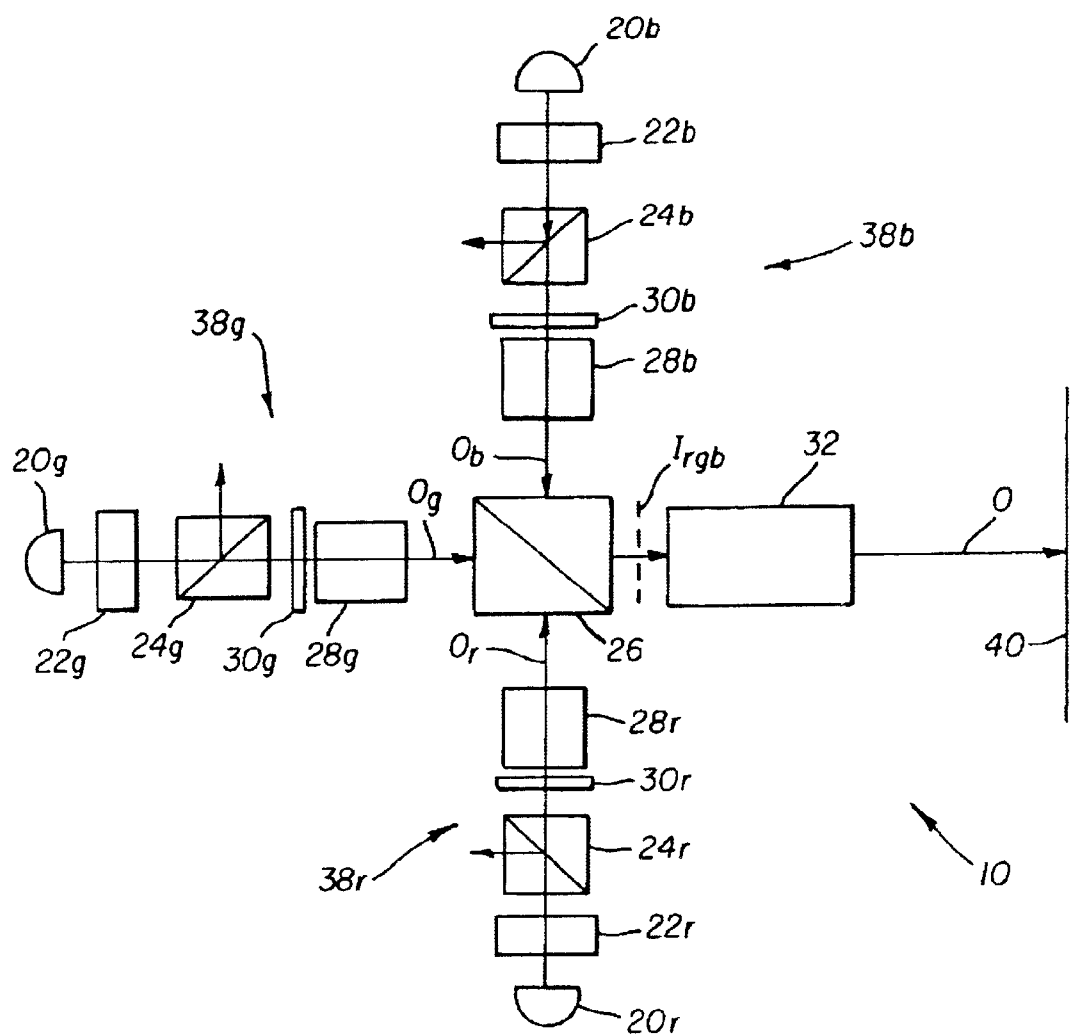
FIG. 8 is a schematic block diagram showing major components of another alternative embodiment of the present invention using a transmissive LCD as spatial light modulator.

Spatial light modulator 30 could alternately be a transmissive LCD, with appropriate adaptations to the imaging optics path, as is shown in the schematic block diagram of FIG. 8. For a transmissive LCD, uniformized light from light source 20 and uniformizing optics 22 could be transmitted or reflected through polarizing beamsplitter 24, or conditioned using other polarizing components, to provide polarized light for modulation by spatial light modulator 30. As is represented in FIG. 8, each component R, G, and B light path would have a parallel structure, with only a minor redistribution of components in each light modulation assembly 38.

As yet another alternative, a DMD could be used as spatial light modulator 30 with appropriate adaptations to the imaging optics path, such as substitution of a total internal reflection (TIR) beamsplitter for polarizing beamsplitter 24, as is well known in the digital projection art.

Figure 7:
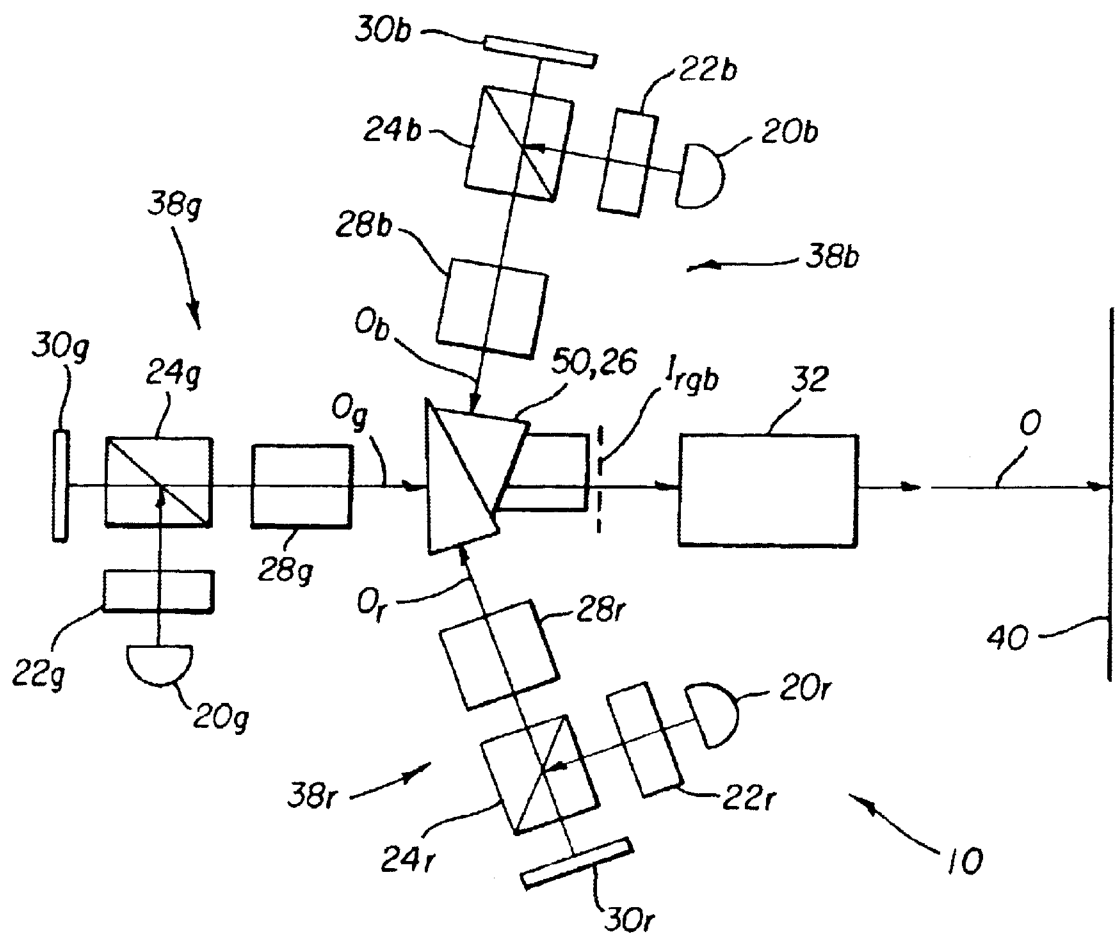
FIG. 7 is a schematic block diagram showing major components of an alternative embodiment of a projection apparatus of the present invention using a Philips prism as dichroic combiner.

Dichroic combiner 26 is an X-cube or X-prism in the preferred embodiment. Other devices performing a similar function could alternately be employed as a dichroic combiner, such as a Philips prism, for example. Referring to FIG. 7, there is shown a schematic block diagram of digital projection system 10 using a Philips prism 50. The angular arrangement of optical axes $O_r$, $O_g$, and $O_b$ differs from that used with the X-cube of FIG. 6, in order to accommodate to the geometry of Philips prism 50. Otherwise, optical components in each light modulation assembly 38 are arranged in similar fashion as with the X-cube arrangement. Again, folding mirrors 16 could alternatively be employed in order to provide a preferred arrangement of components when using Philips prism 50 or for embodiments using DMDs or transmissive LCDs.

The method of the present invention provides particular benefits in an arrangement of projection apparatus 10 using Philips prism 50 as dichroic combiner 26. It can be appreciated that the long working distance of magnifying relay lens 28 can compensate for the working distance requirements of Philips prism 50, which, due to Philips prism geometry, exceed the working distance requirements of the X-cube. Therefore, in the same manner as with X-cube designs, the use of magnifying relay lens 28 with Philips prism 50 eases the back focal distance requirements of projection lens 32. In addition, because Philips prism 50 design utilizes total internal reflection, Philips prism 50 necessarily has limited numerical aperture. This makes it advantageous to use magnifying relay lens 28 to increase the f/# of incident light to Philips prism 50.

The present invention allows the use of any suitable type of illumination system for providing source colored light for modulation by spatial light modulators 30. Light sources could include lamps, filters, LEDs, lasers, or other illumination components. The preferred embodiment uses a Xenon arc lamp as a white light source, with dichroic separators disposed to filter the source illumination in order to provide substantially pure red, green, and blue color light for modulation, following light separation techniques well known in the projection imaging arts.

Use of projection apparatus 10 of the present invention, or applying the methods of the present invention, relaxes the performance and mechanical tolerance requirements of dichroic combiner 26 by increasing the f/# of the optical system, thereby reducing the range of angles incident upon dichroic surfaces in dichroic combiner 26. This results in improved gamut, without compromising brightness. In turn, dichroic combiner 26 then provides to projection lens 32 a combined multicolor magnified image $I_{rgb}$ requiring a reduced numerical aperture and short working distance, thereby reducing the cost and complexity of projection lens 32 design. High contrast can be maintained using the design of the present invention, since magnifying relay lens 28 components are not disposed in the path of the polarized illumination source that is required for LCD spatial light modulators 30; these lens components do not contribute to birefringence in the illumination light.

Because each color path has its own separate magnifying relay lens 28, there is no need for broadband color correction for lens components between spatial light modulator 30 and projection lens 32. Any of magnifying relay lenses 28*r*, 28*g*, or 28*b* can be independently color corrected, if advantageous for the performance of projection apparatus 10; alternately, any two or all three of magnifying relay lenses 28*r*, 28*g*, or 28*b* could be of identical manufacture, thereby reducing fabrication and design costs. Demands on precision fabrication of dichroic combiner 26 are also relaxed due to magnification of the image presented at its input. With these improvements, then, the present invention boosts the imaging performance of projection apparatus 10 and allows simpler, more compact optical design at minimal cost.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, the amount of magnification provided by magnifying relay lens 28 can be any value greater than 1×, and should be suitably matched to the characteristics of other components in the imaging path. Not shown or described in detail are a number of additional supporting polarization components conventionally used to improve contrast and performance of LCD spatial light modulators 30.

Thus, what is provided is an improved projection apparatus and method for digital image projection in which an image generated at a spatial light modulator is relayed to a dichroic combining element using a magnifying, double-telecentric relay lens.

PARTS LIST

10. Digital projection system
16. Mirror
20. Light source
20*r*. Light source, red
20*g*. Light source, green
20*b*. Light source, blue
22. Uniformizing optics
22*r*. Uniformizing optics, red
22*g*. Uniformizing optics, green
22*b*. Uniformizing optics, blue
24. Polarizing beamsplitter
24*r*. Polarizing beamsplitter, red
24*g*. Polarizing beamsplitter, green
24*b*. Polarizing beamsplitter, blue
26. Dichroic combiner
28. Magnifying relay lens
28*r*. Magnifying relay lens, red
28*b*. Magnifying relay lens, green
28*g*. Magnifying relay lens, blue
30. Spatial light modulator
30*r*. Spatial light modulator, red
30*g*. Spatial light modulator, green
30*b*. Spatial light modulator, blue
32. Projection lens
36. Dichroic surface
38. Light modulation assembly
38*r*. Light modulation assembly, red
38*g*. Light modulation assembly, green
38*b*. Light modulation assembly, blue
40. Display surface
42. Prism
44*a*. Surface
44*b*. Surface
50. Philips prism
126. X-cube
126'. X-cube
128*a*. Prism
128*b*. Prism
128*c*. Prism
128*d*. Prism
130*a*. Surface
130*b*. Surface

What is claimed is:

1. A projection apparatus for projecting a multicolor image comprising:

a first light modulation assembly comprising:

a first spatial light modulator for modulating light having a first wavelength and which forms a first image;

a first magnifying relay lens for focusing and relaying said first image;

a second spatial light modulator for modulating light having a second wavelength and which forms a second image;

a second magnifying relay lens for focusing and relaying said second image;

a third spatial light modulator for modulating light having a third wavelength which forms a third image;

a third magnifying relay lens for focusing and relaying said third image;

a dichroic combiner which form a multicolor image by combining said first, second, and third images; and a projection lens for projecting said multicolor image.

2. The projection apparatus according to claim 1 wherein said first wavelength is red, said second wavelength is green, and said third wavelength is blue.

3. The projection apparatus according to claim 1 wherein said spatial light modulator is a reflective LCD.

4. The projection apparatus according to claim 3 wherein said first light modulation assembly, second light modulation assembly, and third light modulation assembly each further comprise a polarizing beamsplitter for directing said incident light having a predetermined polarization state to said spatial light modulator and for directing said first image to said magnifying relay lens.

5. The projection apparatus according to claim 1 wherein said spatial light modulator is a transmissive LCD.

6. The projection apparatus according to claim 1 wherein said spatial light modulator is a digital micromirror device.

7. The projection apparatus according to claim 1 wherein a lamp provides a light source for said projection apparatus.

8. The projection apparatus according to claim 7 wherein said light source comprises a color filter.

9. The projection apparatus according to claim 7 wherein said light source comprises a laser.

10. The projection apparatus according to claim 7 wherein said light source comprises an LED.

11. The projection apparatus according to claim 7 further comprising a polarizer for conditioning the light from said light source.

12. The projection apparatus according to claim 1 wherein said magnifying relay lens provides 2× magnification.

13. The projection apparatus according to claim 1 wherein said magnifying relay lens is double-telecentric.

14. The projection apparatus according to claim 1 wherein said dichroic combiner is an X-cube.

15. The projection apparatus according to claim 1 wherein said dichroic combiner is a Philips prism.

16. The projection apparatus according to claim 1 wherein said first light modulation assembly, second light modulation assembly, and third light modulation assembly each further comprise a polarizer.

17. The projection apparatus according to claim 1 wherein the optical axis of said magnifying relay lens for said first light modulation assembly and the optical axis of said magnifying relay lens for said second light modulation assembly are coaxial with the optical axis of said projection lens.

18. The projection apparatus according to claim 1 wherein said magnifying relay lens for said first light modulation assembly is fabricated to be substantially identical to said magnifying relay lens for said second light modulation assembly.

19. The projection apparatus according to claim 1 wherein said multicolor image formed by said dichroic combiner is a real image.

20. The projection apparatus according to claim 1 wherein said multicolor image formed by said dichroic combiner is a virtual image.

21. A projection apparatus for projecting a multicolor image, the apparatus comprising:

a first light modulation assembly for forming a magnified image having a first wavelength, a second light modulation assembly for forming a magnified image having a second wavelength, and a third light modulation assembly for forming a magnified image having a third wavelength, wherein each modulation assembly is similarly constructed and comprises:

(a) a light source for directing incident light towards a polarizing beamsplitter, said polarizing beamsplitter transmitting light having a first polarization and reflecting light having a second polarization;

(b) a liquid crystal device for modulating incident light having said second polarization to form a first image; and (c) a magnifying relay lens for focusing and relaying said first image towards a dichroic combiner in order to form a magnified real image of said first image;

said dichroic combiner forming a multicolor image by combining said magnified real image having said first wavelength, said magnified real image having said second wavelength, and said magnified real image having said third wavelength; and a projection lens for projecting said multicolor image toward a display surface.

22. The projection apparatus according to claim 21 wherein said first wavelength is red, said second wavelength is green, and said third wavelength is blue.

23. The projection apparatus according to claim 21 wherein said light source comprises a lamp.

24. The projection apparatus according to claim 21 wherein said light source comprises a color filter.

25. The projection apparatus according to claim 21 wherein said light source comprises a laser.

26. The projection apparatus according to claim 21 wherein said light source comprises an LED.

27. The projection apparatus according to claim 21 further comprising a polarizer for conditioning light from said light source.

28. The projection apparatus according to claim 21 wherein said magnifying relay lens provides 2× magnification.

29. The projection apparatus according to claim 21 wherein said magnifying relay lens is double-telecentric.

30. The projection apparatus according to claim 21 wherein said dichroic combiner is an X-cube.

31. The projection apparatus according to claim 21 wherein said dichroic combiner is a Philips prism.

32. The projection apparatus according to claim 21 wherein said first light modulation assembly, second light modulation assembly, and third light modulation assembly each further comprise a polarizer.

33. The projection apparatus according to claim 21 wherein the optical axis of said magnifying relay lens for said first light modulation assembly and the optical axis of said magnifying relay lens for said second light modulation assembly are coaxial with the optical axis of said projection lens.

34. The projection apparatus according to claim 21 wherein said magnifying relay lens for said first light modulation assembly is fabricated to be substantially identical to said magnifying relay lens for said second light modulation assembly.

35. The projection apparatus according to claim 21 wherein said multicolor image formed by said dichroic combiner is a real image.

36. The projection apparatus according to claim 21 wherein said multicolor image formed by said dichroic combiner is a virtual image.

37. A method for projecting a multicolor image toward a display surface, the method comprising:

(a) forming, from an incident light of a first wavelength, a magnified real image having said first wavelength using the steps of:

(a1) modulating said incident light of said first wavelength at a first spatial light modulator to form a first image having said first wavelength;

(a2) magnifying and relaying said first image having said first wavelength towards a dichroic combiner to form said magnified real image having said first wavelength;

(b) forming, from an incident light of a second wavelength, a magnified real image having said second wavelength using the steps of:

(b1) modulating said incident light of said second wavelength at a second spatial light modulator to form a first image having said second wavelength;

(b2) magnifying and relaying said first image having said second wavelength towards said dichroic combiner to form said magnified real image having said second wavelength;

(c) forming, from an incident light of a third wavelength, a magnified real image having said third wavelength using the steps of:

(c1) modulating said incident light of said third wavelength at a second spatial light modulator to form a first image having said third wavelength;

(c2) magnifying and relaying said first image having said third wavelength towards said dichroic combiner to form said magnified real image having said third wavelength;

(d) combining, along a common optical axis, said magnified real image having said first wavelength, said magnified real image having said second wavelength, and said magnified real image having said third wavelength to form a multicolor image for projection; and (e) projecting said multicolor image toward the display surface.

38. The method of claim 37 wherein the step of modulating said incident light of said first wavelength comprises the step of modulating an LCD spatial light modulator.

39. The method of claim 37 wherein the step of modulating said incident light of said first wavelength comprises the step of modulating a digital micromirror device.

40. The method of claim 37 wherein said incident light of said first wavelength is from a lamp.

41. The method of claim 37 wherein said incident light of said first wavelength is from a laser.

42. The method of claim 37 wherein said incident light of said first wavelength is from an LED.

43. The method of claim 37 wherein the step of combining said magnified real image having said first wavelength, said magnified real image having said second wavelength, and said magnified real image having said third wavelength comprises the step of using a dichroic combiner.

44. The method of claim 43 wherein the step of using a dichroic combiner comprises the step of using an X-cube.

45. The method of claim 43 wherein the step of using a dichroic combiner comprises the step of using a Philips prism.

46. The method of claim 37 wherein the step of modulating said incident light of said first wavelength comprises the step of modulating a red light, wherein the step of modulating said incident light of said second wavelength comprises the step of modulating a green light, and wherein the step of modulating said incident light of said third wavelength comprises the step of modulating a blue light.

47. A projection apparatus comprising:

a first light source having a first wavelength;

a first spatial light modulator for modulating incident light from said first light source to form a first image;

a first relay lens for focusing and relaying said first image;

a second light source having a second wavelength;

a second spatial light modulator for modulating incident light from said second light source to form a second image;

a second relay lens for focusing and relaying said second image;

a third light source having a third wavelength;

a third spatial light modulator for modulating incident light from said second light source to form a third image;

a third relay lens for focusing and relaying said third image;

a dichroic combiner which forms multicolor images by combining said first, second, and third images;

a projection lens for projecting said multicolor image; and wherein each of said relay lens provides magnification.

48. The projection apparatus according to claim 47 wherein said spatial light modulator is a reflective LCD.

49. The projection apparatus according to claim 47 wherein said spatial light modulator is a transmissive LCD.

50. The projection apparatus according to claim 47 wherein said spatial light modulator is a digital micromirror.

51. The projection apparatus according to claim 47 wherein said light source comprises a lamp.

52. The projection apparatus according to 47 wherein said light source comprises a laser.

53. The projection apparatus according to claim 47 wherein said light source comprises an LED.

54. The projection apparatus according to claim 47 wherein said dichroic combiner is an X-cube.

55. The projection apparatus according to claim 47 wherein said dichroic combiner is a Philips prism.

56. The projection apparatus according to claim 47 wherein said multicolor image formed by said dichroic combiner is a real image.

57. The projection apparatus according to claim 47 wherein said multicolor image formed by said dichroic combiner is a virtual image.

58. A projection apparatus for projecting a multicolor image comprising:

a first light source having a first wavelength;

a first means for modulating incident light from said first light source to form a first image;

a first means for focusing and relaying said first image to form a magnified real image of said first image;

a second light source having a second wavelength;

a second means for modulating incident light from said second light source to form a second image;

a second means for focusing and relaying said second image to form a magnified real image of said second image;

a third light source having a third wavelength;

a third means for modulating incident light from said third light source to form a third image;

a third means for focusing and relaying said third image to form a magnified real image of said third image;

a dichroic combiner which form a multicolor image by combining said first, second, and third magnified images; and a projection lens for projecting said multicolor image.

59. The projection apparatus according to claim 58 wherein at least one of said modulating means is a reflective LCD.

60. The projection apparatus according to claim 58 wherein at least one of said modulating means is a transmissive LCD.

61. The projection apparatus according to claim 58 wherein at least one of said modulating means is a digital micromirror.

62. The projection apparatus according to claim 58 wherein at least one of said light source comprises a lamp.

63. The projection apparatus according to claim 58 wherein at least one of said light source comprises a laser.

64. The projection apparatus according to claim 58 wherein at least one of said light source comprises an LED.

65. The projection apparatus according to claim 58 wherein each of said focusing and relaying means provides at least 2× magnification.

66. The projection apparatus according to claim 58 wherein said dichroic combiner is an X-cube.

67. The projection apparatus according to claim 58 wherein said dichroic combiner is a Philips prism.

68. The projection apparatus according to claim 58 wherein said multicolor image formed by said dichroic combiner is a real image.

69. The projection apparatus according to claim 58 wherein said multicolor image formed by said dichroic combiner is a virtual image.

* * * * *